United States Patent [19]

Svensson et al.

[11] Patent Number: 4,974,876
[45] Date of Patent: Dec. 4, 1990

[54] SEAT BELT RETRACTOR

[75] Inventors: Gosta P. A. Svensson, Gothenberg, Sweden; Per-Olaf Weman, Heverlee, Belgium

[73] Assignee: Autoliv Development Aktiebolag, Varcada, Sweden

[21] Appl. No.: 382,649

[22] PCT Filed: Sep. 30, 1988

[86] PCT No.: PCT/SE88/00507
§ 371 Date: Jul. 25, 1989
§ 102(e) Date: Jul. 25, 1989

[87] PCT Pub. No.: WO89/02841
PCT Pub. Date: Apr. 6, 1989

[30] Foreign Application Priority Data

Oct. 2, 1987 [GB] United Kingdom ............... 8723212

[51] Int. Cl.⁵ .................. B60R 22/20; B60R 22/24; B60R 22/34
[52] U.S. Cl. ................................. 280/807; 280/801; 280/808; 242/107; 297/475
[58] Field of Search ............... 280/801, 802, 803, 804, 280/807, 808; 297/483, 484, 468, 474, 475, 483; 74/840, 424.5; 242/107.4 A, 107

[56] References Cited

U.S. PATENT DOCUMENTS

| 3,488,090 | 1/1970 | Douglas | 297/389 |
| 3,869,097 | 3/1975 | Peel et al. | 297/475 |
| 3,997,126 | 12/1976 | Karlsson | 242/107 |
| 4,147,387 | 4/1979 | Coenan | 242/107 |
| 4,547,717 | 10/1985 | Radermacher et al. | 280/808 |
| 4,765,651 | 8/1988 | Unger | 280/808 |

FOREIGN PATENT DOCUMENTS

| 2614472 | 10/1977 | Fed. Rep. of Germany . |
| 2618255 | 11/1977 | Fed. Rep. of Germany . |
| 2720789 | 11/1978 | Fed. Rep. of Germany . |
| 327915 | 8/1970 | Sweden . |
| 388128 | 9/1976 | Sweden . |
| 2162045 | 1/1986 | United Kingdom . |

Primary Examiner—Richard A. Bertsch
Attorney, Agent, or Firm—Spencer & Frank

[57] ABSTRACT

An assembly for retracting a seat belt having a support and an elongate shaft mounted substantially vertically thereon. The seat belt is windable about the shaft, the arrangement being such that the seat belt forms a reel about the shaft. A selectively operable device is provided to prevent withdrawal of the seat belt from the assembly. The shaft has an exposed region about which the reel may be formed, the length of this exposed region being significantly greater than the width of the seat belt so that the part of the belt emerging from the reel may be positioned vertically at any selected position along the exposed region of the shaft.

16 Claims, 4 Drawing Sheets

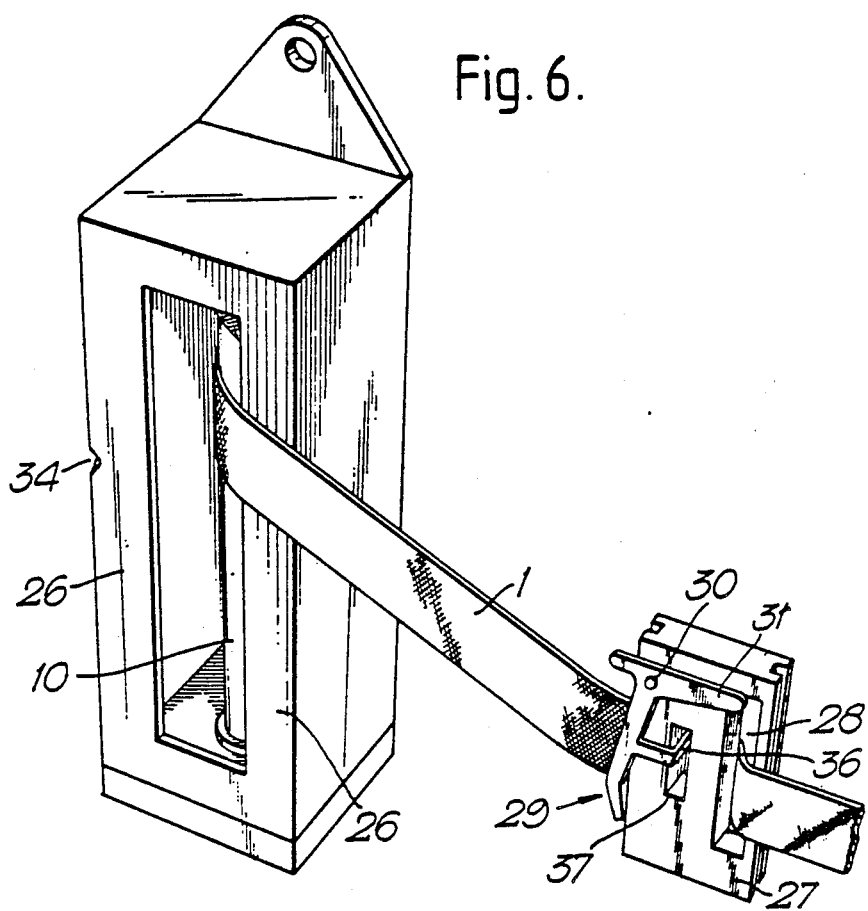
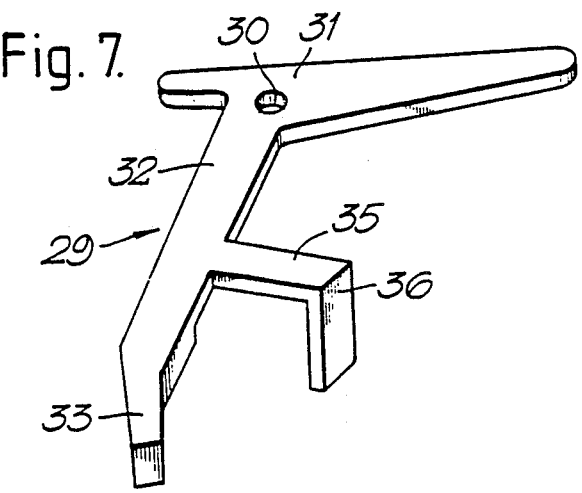

SEAT BELT RETRACTOR

BACKGROUND OF THE INVENTION

The present invention relates to a seat belt retractor and to a seat belt arrangement incorporating such a retractor.

Motor vehicles are provided with seat belts to retain people travelling in such vehicles in their seats in the event of an accident arising. Ideally each seat belt should act to keep the person wearing the belt fully in their seat, without any significant forward movement relative to the seat, in order to minimise any risk of the person hitting their head on the windshield or on the steering wheel.

It has been realised that if a safety belt is to perform correctly under accident conditions, the belt should be worn correctly, and in the case of the now conventional diagonal-and-lap belt, the belt should pass over the shoulder of the person wearing the belt and should then extend substantially horizontally to a point able to withstand the load created when an accident arises and the vehicle decelerates very rapidly.

Various proposals have been made regarding adjustable guides for seat belts to be mounted on the door pillars (or B-posts) of motor vehicles If such a guide is to be used the retractor reel is mounted on the floor adjacent to the B-post and the belt passes from the retractor through the guide over the shoulder of the person who is wearing the belt and then to a buckle, the belt then passing over the lap of the person wearing the belt to an anchoring point on the floor.

In one of these proposed guides there is an adjustment knob which can be operated to permit a carriage, which has a loop or guide through which the belt passes, to be slid up and down a vertical mounting rail which is secured to the B-post. See, for example, GB-2162045A which shows an arrangement of this type. If a person wearing the seat belt, for example the driver of the car, is to adjust the belt, he must turn his upper torso to be able to operate the adjustment knob, and then slide the carriage up or down. While he is in the necessary twisted position, the shoulder over which the belt will pass when in use, is not in the position that it will occupy ordinarily. Thus it is not possible to adjust the belt directly. Instead, an adjustment must be made, and the driver must return to the ordinary driving position before it can be ascertained whether the adjustment is correct or not. The procedure may need to be repeated several times before the adjustment is precisely correct. Of course, this adjustment cannot be carried out safely while driving, and thus the adjustment procedures must be completed before the driver starts to drive the car. Consequently, because the adjustment procedure is complicated and time-consuming, many drivers do not bother to make any adjustment at all, even though the facility for making an adjustment is provided. Thus such drivers may be driving with a safety belt which is ill-fitting and which will not provide an adequate degree of protection in the event of an accident.

It has been proposed to provide an automatically adjusting arrangement, in which a carriage is provided having a loop or guide through which the belt passes, the carriage being driven, by means of a motor, along a vertical rail mounted on the B TM post For example, the motor may drive a worm or screw that passes through a nut and is mounted on the carriage. The carriage can thus be driven up and down the rail. A position sensor may be provided to stop the carriage when it is sensed that the seat belt is in an optimum position. However, while such devices may operate in a very satisfactory manner, they are not cheap to produce, and thus such devices will only be commercially acceptable in very expensive cars.

Another problem that is encountered with safety belts is that of the stretch or resilience of the belt material. The safety belt material does stretch by a certain percentage of its length when subjected to the loads that can be experienced under accident conditions, especially if the person wearing the safety belt is heavy, or if the motor vehicle is subJected to severe deceleration from a high speed. In a typical safety belt of the diagonal-and-lap design, the length of safety belt that is exposed, and is thus available to stretch, approaches three meters. One end of the belt is located on the floor adjacent to the base of the B-post, and the belt passes from this end, across the lap of the person wearing the belt, to a tongue which is received in a releasable buckle. The belt then passes across the chest and over the shoulder of the person wearing the belt, finally passing through a guide at shoulder level and back down to floor level where it is received in the retractor reel. It is to be understood therefore that if such a belt is subjected to such a load that the belt is caused to stretch by ten per cent, then the total stretch will be approximately 30 cm. This degree of stretch will permit the person wearing the belt to move forwardly to a certain extent, and the person wearing the belt may then hit his head against the windshield or steering wheel.

The present invention seeks to provide a new retractor reel, which can be used in a seat belt arrangement, that provides an improvement over the prior art as discussed above.

SUMMARY OF THE INVENTION

According to this invention there is provided a seat belt retractor assembly, comprising a support on which is mounted an elongate shaft about which a seat belt may be reeled, means to wind in said seat belt to form a reel about the shaft, and selectively operable means to prevent the withdrawal of seat belt from said assembly. The shaft is substantially vertical having an exposed region about which the reel may be formed. The length of the exposed region is significantly greater than the width of the seat belt so that the seat belt may be positioned with the part of the belt emerging from the reel having any selected position along said exposed region of the shaft. The length of the exposed region may be two or more times the width of the belt.

In one embodiment a spool is mounted on said shaft, the spool being movable axially on the shaft along said exposed region and being adapted to have the belt wound on to it. It may however be preferable to wind the safety belt directly onto the shaft. The surface of the shaft may be roughened or otherwise provided with a high friction surface.

The exposed region of the shaft may be of non-uniform cross section being of conical or tapering form, or being of non-round cross section.

In certain embodiments a roller is provided, extending substantially parallel both the shaft and being biassed towards the shaft to trap part of the belt between the roller and the shaft. This may help prevent the so-called "film-spool" effect.

Preferably a belt guide is provided which engages and guides the belt on to and from said reel, the guide being mounted for movement in a direction substantially parallel with the axis of the shaft.

The guide may be spring biassed to a predetermined position. Preferably means are provided to retain the belt guide in a predetermined position, which may be a terminal position.

Conveniently means are provided to release the means which retain the belt guide when a predetermined length of safety belt has been wound on to said shaft.

In another embodiment a locking lever is associated with the guide, the locking lever being movable to a position in which movement of the guide is prevented when the guide is at one terminal position, and being moved to a release position in response to a predetermined length of safety belt being wound on to the shaft.

In an alternative embodiment the belt passes, from the shaft, through a slot. The slot is provided with one or more recesses formed in the side thereof.

The invention also relates to a seat belt arrangement incorporating a retractor assembly as described, the retractor being mounted in position with the shaft substantially vertical, and such that when a person who is to wear the belt sits in his seat, the retractor assembly is adjacent the shoulder of that person.

BRIEF DESCRIPTION OF THE DRAWINGS

In order that the invention may be more readily understood, and so that further features thereof may be appreciated, the invention will now be described, by way of example, with reference to the accompanying drawings in which FIG. 6 is a diagrammatic exploded view showing yet another embodiment of the invention, FIG. 7 is a perspective view of a lever forming part of the embodiment of FIG. 6.

DETAILED DESCRIPTION OF THE PREFERRED EMBODIMENTS

Figure 1:
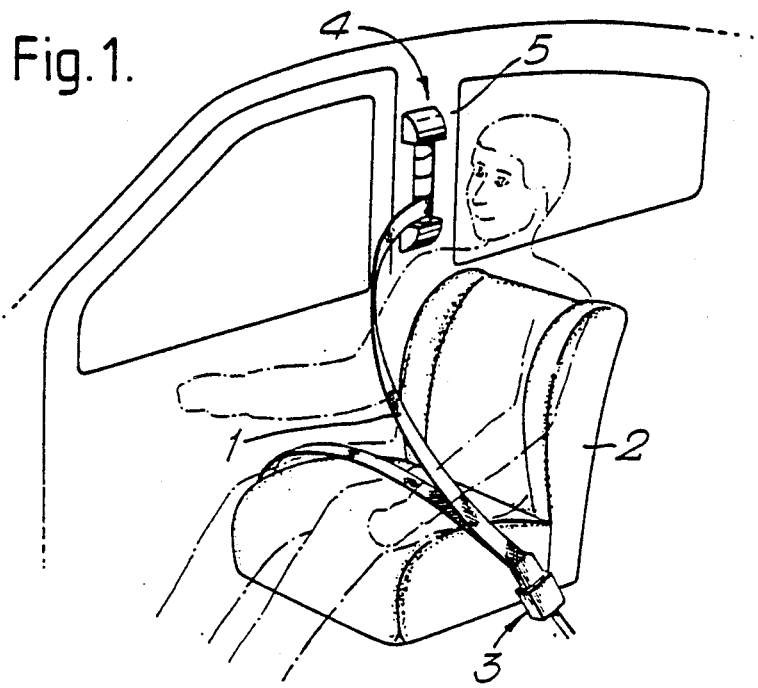
FIG. 1 is a perspective view showing a retractor reel in accordance with the invention mounted in a car.

Referring initially to FIG. 1 of the accompanying drawings, a seat belt of the diagonal-and-lap configuration 1 is mounted in a motor vehicle to protect a person sitting in a seat 2. One end of the belt 1 is connected to an anchor point on the floor of the motor vehicle on one side of the seat (not visible) and the belt then passes across the lap of a person sitting in the seat to a tongue which is to be inserted into a conventional releasable buckle 3. The belt then passes up across the chest and shoulder of the person wearing the belt to a retractor reel 4 in accordance with the invention which is mounted on the B-post 5 of the motor vehicle at an elevated position just above the shoulder of a person sitting in the seat 2.

Figure 2:
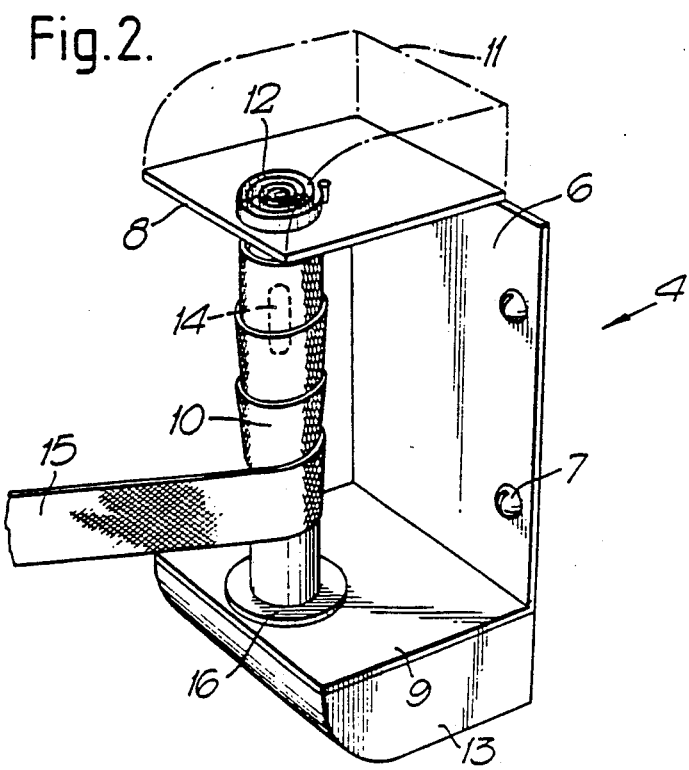
FIG. 2 is an enlarged perspective view showing a reel in accordance with the invention.

As can be seen more clearly from FIG. 2 of the drawings, the retractor reel comprises a support plate 6 that can be connected to the B-post by means of bolts passing through two apertures 7 formed in the support plate 6. Of course, the support plate 6 may alternatively be formed integrally with the B-post if desired. At upper and lower positions on the support plate, there are forwardly projecting wings or tabs 8, 9. The wings have apertures and receive the ends of a shaft 10 which is thus rotatably mounted, the shaft 10 thus extending substantially vertically between the wings 8 and 9. A cover 11 (shown in phantom in FIG. 2) is mounted on the upper wing 8. A helical spring 12 is provided within the cover 11 and engages the upper end of the shaft 10 to apply a torque to the shaft.

The lower wing 9 is provided, on its under surface, with a housing 13. The housing 13 contains a mechanism or arrangement which can selectively lock the shaft 10 to prevent rotation of the shaft. Such mechanisms are well known in the seat belt retractor art. The mechanics may include means responsive to a predetermined vehicle acceleration or deceleration to lock the shaft, or means responsive to a rate of rotation of the shaft, or responsive to a rate of acceleration of the shaft, in excess of a predetermined limit, to lock the shaft.

The shaft is provided, adjacent its upper end, with a diametrically extending slot 14 to which is secured one end of the seat belt 1. The belt 1 is wound round or reeled directly on to the shaft 10. The length of the shaft 10 that is exposed to receive the seat belt reeled on to the shaft is at least two times the width of the safety belt, and in this embodiment is several times greater than the width of the webbing 15 of the safety belt 1. Thus the length of shaft exposed to receive the reeled in safety belt may have a length of two, three or more times the width of the safety belt 1.

The helical spring 12 is arranged so that it biases the shaft to wind in the safety belt to form a reel of safety belt on the shaft 10.

It will be appreciated that when a safety belt retractor as described above is used, initially the person who is to use the belt will pull a length of belt from the retractor reel, thus rotating the shaft 10 and tensioning the spring 12. The belt will then be placed in the position in which the belt is to be worn, and will be retained by the buckle 3. Any slack in the belt will then be released and a length of belt will be withdrawn back into the retractor reel 4 under the effect of the spring 12. Since the belt 1 that is being wound on to the shaft 10 passes over the shoulder of the person wearing the belt, as the slack in the belt is taken up, the belt will adopt the correct position on the vertical shaft 10.

For example, if the person wearing the belt is tall, his shoulder may be substantially aligned with the top of the exposed part of the vertical shaft 10. Consequently, when the safety belt 1 is wound on to the shaft 10, the safety belt is wound on to only the upper region of the shaft and then extends substantially horizontally to the shoulder of the person wearing the belt. In contrast, if the person wearing the safety belt is short, his shoulder may be aligned with the lower region of the exposed part of the shaft 10. In such a case, when any slack in the safety belt is taken up, the safety belt 1 will wind on to the exposed length of the shaft 10 in the form a spiral, as shown in FIG. 2, with the strap emerging from the shaft at a relatively low position, substantially horizontally aligned with the shoulder of the person wearing the belt. Thus the belt will again extend substantially horizontally from the shaft to the shoulder of the person wearing the belt. It will thus be understood that the described arrangement provides an automatic adjusting effect, adjusting the point at which the belt is received on to the shaft.

A further advantage of the described embodiment, when compared with the prior art, is that the retractor reel is located at an elevated position, and consequently the length of safety belt that is exposed and that is available to stretch when a great load is applied to the belt under accident conditions, is less than in the prior art arrangement. Thus in any accident situation, the absolute amount of stretch will be less than in the prior art. By way of comparison, the exposed length of belt in a typical arrangement in accordance with the invention will be about 2 meters, giving a total stretch of only 20 cm when the belt is exposed to a load which provides a ten per cent stretch. This may be compared with the 30 cm stretch of the typical prior art arrangement under identical conditions. The difference in stretch of 10 cm may make the difference between life and death for a person restrained by the safety belt.

FIG. 2 illustrates a spool flange 16 mounted on the shaft 10 adjacent the lower wing 9 carried by the support plate. This serves to minimise any risk of the safety belt 1 from becoming caught on the wing 9, particularly in the region where the shaft 10 passes through the wing 9. It may also be preferred for the outer surface of the shaft 10 to be made to have high friction properties. Thus a sleeve of high friction material may be mounted on the shaft, or the outer surface of the shaft may be roughened or knurled.

Instead of having the belt reeled directly on to the shaft 14, the belt could instead be reeled on to a spool mounted on a vertical shaft corresponding to the shaft 10. The spool may have an available width which is two or more times the width of the belt. Alternatively the spool may have an available width which is substantially the same as the width of the belt, and the spool may be mounted to effect a sliding movement up and down the shaft over a length equal to at least twice the width of the belt.

In certain circumstances it may be desired for such a spool to be spring biased towards an upper position and indeed it may also be desirable for such a spool to be provided with a releasable mechanism to retain the spool in the upper position. Thus, by utilising such a mechanism, the spool may either self-adjust its height or may be locked in an upper position.

Figure 3:
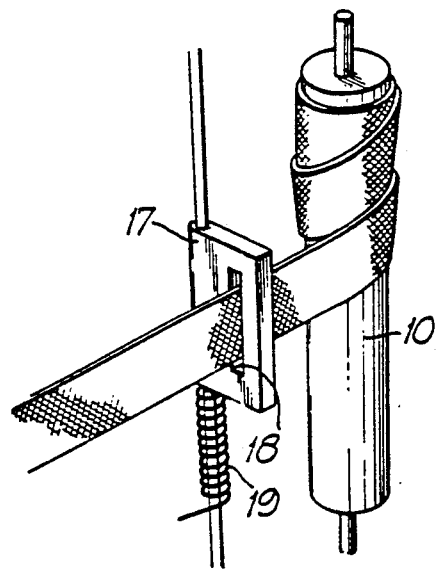
FIG. 3 is a diagrammatic view showing the main operative parts of a modified embodiment of the invention.

Further modifications may also be effected to the described embodiment. FIG. 3 illustrates such a modified arrangement in which a guide member 17 is provided to guide the safety belt 1 on to the shaft 10. The guide member defines a slot 18 through which the terminal portion of the safety belt 1 passes The guide member is mounted for vertical movement up and down a vertical rod 19 which is parallel with the axis of the shaft 10. The guide member may, as with the spool mentioned above, be biased towards an upper position, by a spring, and may also be provided with means for selectively retaining the guide member in an upper position.

Figure 4:
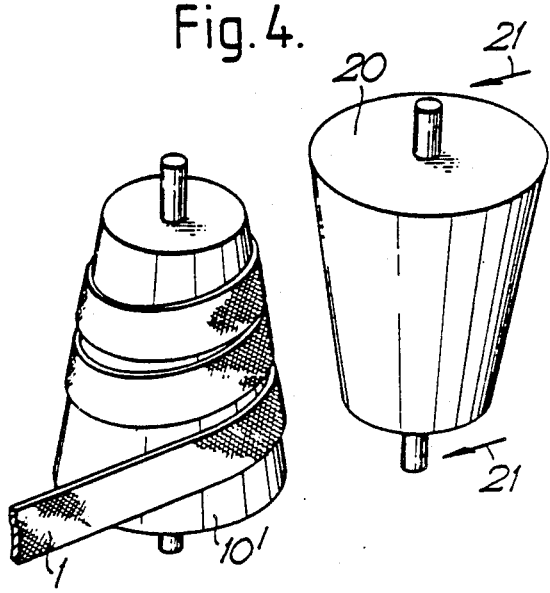
FIG. 4 is a diagrammatic view showing the main parts of another modified embodiment of the invention.

FIG. 4 illustrates a further modified embodiment of the invention in which the main shaft 10' is of varying cross section. The shaft 10' is illustrated as having a conical cross section. This may assist the automatic adjustment function as described above. In the embodiment illustrated in FIG. 4 a second roller 20 is provided which is located adjacent the shaft 10'. The roller 20 is urged into contact with the shaft 10' in the direction of the arrows 21 by appropriate pressure applying means, such as springs or the like. This serves to create a "nip" which will help ensure that the safety belt is always reeled neatly on to the shaft 10' and will help minimise any problem that may arise from the so-called "film spool effect". Such problems may also be overcome by making the cross-section of the exposed region of the shaft on which the reel of safety belt is formed to be non-circular, for example eliptical.

While reference has been made to arrangements in which the shaft may be locked to prevent the withdrawal of belt from the retractor under certain circumstances, it is to be appreciated that alternatively the belt may be directly clamped, or locked in some other way, either in response to a sensor carried within the retractor arrangement, or in response to a signal from a central sensor.

Figure 5:
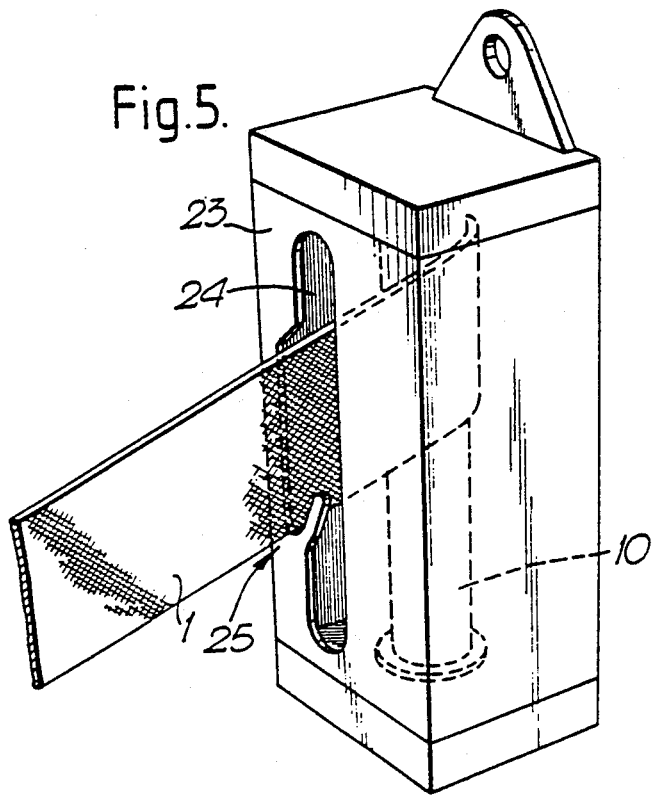
FIG. 5 is a diagrammatic view, with parts shown in phantom, of another embodiment of the invention.

As has been mentioned above, in certain circumstances it may be desired to retain the safety belt at an upper or elevated position relative to the shaft 10. FIG. 5 illustrates an embodiment of the invention where a facility is provided for performing this function, in the form of a housing 23 which defines a slot 24 through which the safety belt 1 emerges. The slot 24 defines one or more notches 25 in one side wall thereof, dimensioned to receive the safety belt. In the illustrated embodiments the notch 25 is provided on the left-hand side of the slot 24. It will be understood that when the safety belt runs through the right-hand side of the slot, the safety belt can freely move up and down to effect the self-adjustment procedure described above. However, if the safety belt is moved to the left, as shown in FIG. 5, so that the edge of the safety belt 1 is engaged within the notch 25, then the safety belt will not be free to move downwardly. Thus the safety belt may be retained in a relatively elevated position with reference to the shaft 10. Of course, while FIG. 5 illustrates only one notch 25, two or more such notches may be provided.

FIG. 6 illustrates yet a further embodiment of the invention in which an arrangement is provided to retain the safety belt in a position adjacent to the top of the shaft 10. In this arrangement, two parallel guides 26 are formed which extend parallel with the axis of the shaft 10. The guides form the two opposed sides of an aperture in the housing of this embodiment of the invention. A carriage 27 is provided which moves axially along the guides. The carriage 27 defines a slot 28 through which the safety belt 1 emerges. Dependency upon the height of the shoulder of the person wearing the seat belt, the carriage 27 moves up and down the guides 26, and the slot 28 is thus located at different positions. Consequently, the safety belt 1 is wound on the shaft 10 at different positions. A lever 29 is pivotally mounted on the carriage for rotation about an axis 30. The lever has a first arm portion 31 which extends substantially horizontally as shown in FIG. 6 and a depending substantially vertically extending arm portion 32 having an inwardly cranked lower end 33.

If the position of the shoulder of the person wearing the belt is such that, as the belt is withdrawn, the carriage moves upwardly, the belt will engage the horizontal portion 31 of the lever, which extends over the upper part of the slot 28. Thus the lever is biassed to rotate in a counterclockwise direction. The lower end 33 of the lever slides against the exterior of the housing until it is aligned with the notch 34. The lower end 33 of the depending arm 32 thus becomes engaged in the notch 34 provided on the exterior of the housing. The carriage is thus locked in a predetermined upper position and cannot move downwardly unless the lever is released.

However, the depending arm 32 is provided with a horizontally extending projection 35 which carries a rearwardly directed tab 35, the tab passing through an aperture 37 formed in the carriage for this purpose to enable the tab 36 to lie adjacent the shaft 10. The arrangement is such that when a significant proportion of the safety belt 1 has been wound on the shaft 10 with the carriage in the upper-most position, the tab 36 will contact the exterior of the reel of belt formed on the shaft 10, and as more of the sent belt is wound on to the shaft, the lever will be forced to rotate in a clock-wise direction, thus removing the inwardly cranked end 33 of the arm 32 from the notch or recess 34. The carriage is thus again free to move.

Figure 8:
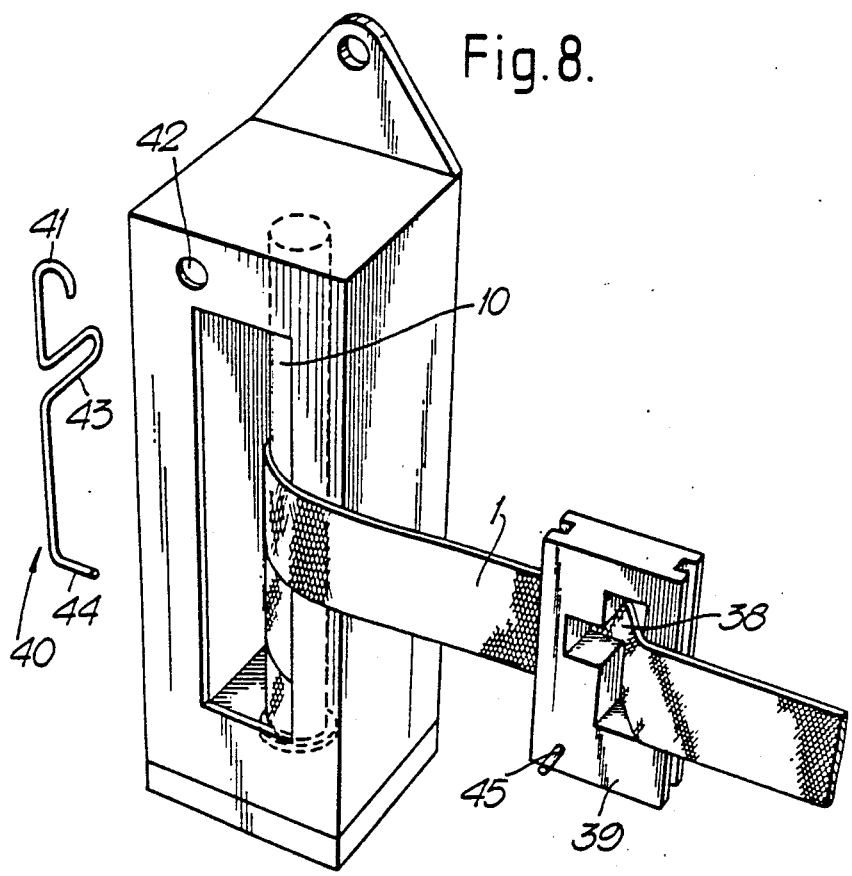
FIG. 8 is a perspective exploded view of another embodiment of the invention.

FIG. 8 illustrates another embodiment of the invention which is generally similar to the embodiment shown in FIG. 7. The portion of the safety belt 1 emerging from the shaft 10 passes through a slot 38 formed in a carriage 39. The carriage is mounted on the housing for axial movement. A locking member 40 is provided which is mounted on a part of the housing, with a hook shaped part 41 of the locking member passing through an aperture 42. The locking member has an intermediate bent portion 43 and a terminal laterally directed engagement portion 44 which, when the carriage 39 is in an elevated position, can engage an a detent 45 formed on the carriage. The abutment 45 is in the form of a projecting peg. The arrangement is such that when the carriage 39 is in an elevated position and the engagement portion 44 on the locking member 40 has been engaged with the detent 45, the carriage is retained in that elevated position. The bent portion 43 extends through the slot 38 to lie adjacent the shaft 10. However, if the safety belt 1 is retracted on to the shaft 10, the exterior of the reel of belt will engage the bent portion 43 of the member 40, thus moving the locking member 40, releasing the engagement portion 44 from the detent 45, thus enabling the carriage 39 to resume its movement axially, as mentioned above.

It may be possible to provide the carriage with a plurality of spaced apart detents 45 so that the carriage may be locked selectively at different positions.

Figure 9:
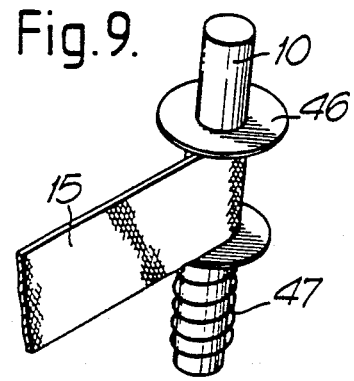
FIG. 9 is a perspective view of the essential parts of another embodiment of the invention.

FIG. 9 illustrates the essential parts of an alternative embodiment of the invention in which a spool 46, which is as wide as the webbing of the seatbelt 15 is mounted for slidable movement on the exposed part of the shaft 10. Thus the spool 46 can rotate relative to the shaft, and can also slide up and down the shaft. The spool is shown being biassed to an upper position by a spring 47 which surrounds the lower part of the shaft 10. It will be understood that the above description of the present invention is susceptible to various modifications, changes and adaptations, and the same are intended to be comprehended within the meaning and range of equivalents of the appended claims.

We claim:

1. An assembly for retracting a seat belt, comprising a support; an elongate shaft mounted substantially vertically on the support, the seat belt being windable around the shaft; means to wind in said seat belt to form a reel about the shaft, and selectively operable means to prevent the withdrawal of the seat belt from said assembly, the shaft having an exposed region about which the reel may be formed, the length of the exposed region being significantly greater than the width of the seat belt so that the part of the belt emerging from the reel may be positioned vertically at any selected position along said exposed region of the shaft.

2. An assembly according to claim 1 wherein a spool is mounted on said shaft, the spool being axially movable along said exposed region on the shaft and being adapted to have the belt wound on to it.

3. An assembly according to claim 1 wherein the exposed region of the shaft has a varying cross-section.

4. An assembly according to claim 3, wherein the exposed region of the shaft has a conical cross section.

5. An assembly according to claim 3, wherein the exposed region of the shaft has an elliptical cross section.

6. An assembly according to claim 1, further comprising a roller disposed substantially parallel with the shaft and biassed towards the shaft to trap part of the belt between the roller and the shaft.

7. An assembly according to claim 1, further comprising a belt guide which engages and guides the belt on to and from said reel, the guide being mounted for movement in a direction substantially parallel with the axis of the shaft.

8. An assembly according to claim 7, further comprising means for retaining the belt guide in one predetermined position.

9. An assembly according to claim 8 further comprising means for releasing the means for retaining the belt guide when a predetermined length of safety belt has been wound on to said shaft.

10. An assembly according to claim 8 wherein said guide further comprises a locking lever, the locking lever being movable to a position in which movement of the guide is prevented when the guide is at one terminal position, and being moved to a release position in response to a predetermined length of safety belt being wound on to said shaft.

11. An assembly according to claim 1, wherein the belt passes, from the shaft, through a slot, the slot being provided with at least one recess formed in the side thereof.

12. A seat belt arrangement incorporating a retractor assembly according to claim 1 the retractor being mounted in position with the shaft substantially vertical, and such that when a person who is to wear the belt sits in his heat, the retractor assembly is adjacent the shoulder of that person.

13. An assembly according to claim 1, further comprising a housing in which the shaft is disposed, the housing having a substantially vertical slot through which the belt passes.

14. An assembly according to claim 13, wherein the slot is a first slot, further comprising a carriage which moves axially along the first slot, the carriage having a second slot through which the belt passes and a means for locking the position of the carriage axially on the first slot.

15. An assembly according to claim 14, wherein the first slot has a notch and the means for locking the position of the carriage comprises an L-shaped lever and a cranked end on a first arm of the L-shaped lever, the lever being pivotally mounted on the carriage, wherein, when the carriage moves axially upward on the first slot, the belt presses against a second arm of the L-shaped lever causing the L-shaped lever to pivot on the carriage and the cranked end of the first arm to engage the notch of the first slot, whereby the carriage is locked on the first slot.

16. An assembly according to claim 14, wherein the housing has an aperture, the carriage has at least one detent, and the means for locking the position of the carriage comprises a locking member having a hooked terminal end, an intermediate bent portion, and laterally projecting engagement portion on the opposing terminal end, the hooked terminal end mating with the aperture of the housing, wherein the engagement portion of the locking member engages a detent when the carriage moves axially upward on the first slot, whereby the carriage is locked in a position on the housing, and the carriage is released from the position when the belt is retracted and the exterior of the reel engages the bent portion of the locking member, thereby releasing the engagement portion from the detent.

* * * * *